United States Patent [19]
Sheridan et al.

[11] 4,164,633
[45] Aug. 14, 1979

[54] PUSH-PULL ROTARY SYSTEM

[75] Inventors: John J. Sheridan, Middletown; Willard E. Graddy; Willis H. Anderson, both of Anderson, all of Ind.

[73] Assignee: General Motors Corporation, Detroit, Mich.

[21] Appl. No.: 874,490

[22] Filed: Feb. 2, 1978

[51] Int. Cl.² ............................................. H01H 9/00
[52] U.S. Cl. ........................................ 200/4; 200/18; 200/156; 338/172
[58] Field of Search .......... 200/4, 16 R, 16 C, 16 D, 200/18, 156; 338/165, 172, 173, 190–193, 200, 202, 215

[56] References Cited
U.S. PATENT DOCUMENTS

| | | | |
|---|---|---|---|
| 2,779,827 | 1/1957 | Brown et al. | 200/16 C |
| 2,948,832 | 8/1960 | Hollins | 200/16 C X |
| 3,120,585 | 2/1964 | Harns, Jr. et al. | 200/6 R |
| 3,244,822 | 4/1966 | Elliott | 200/16 C |
| 3,259,713 | 7/1966 | Herridge, Jr. et al. | 200/33 R X |
| 3,349,358 | 10/1967 | Cassedy, Jr. | 338/198 X |
| 3,750,080 | 7/1973 | Rouvre et al. | 200/4 X |

FOREIGN PATENT DOCUMENTS 1096779  1/1961  Fed. Rep. of Germany .............. 200/4

Primary Examiner—James R. Scott
Attorney, Agent, or Firm—Edward J. Biskup

[57] ABSTRACT

A push-pull rotary switch for controlling a plurality of lighting circuits on a motor vehicle that includes a longitudinally movable rod adapted to control at least one switch means during its longitudinal movement and an additional switch means when the rod is rotated.

7 Claims, 8 Drawing Figures

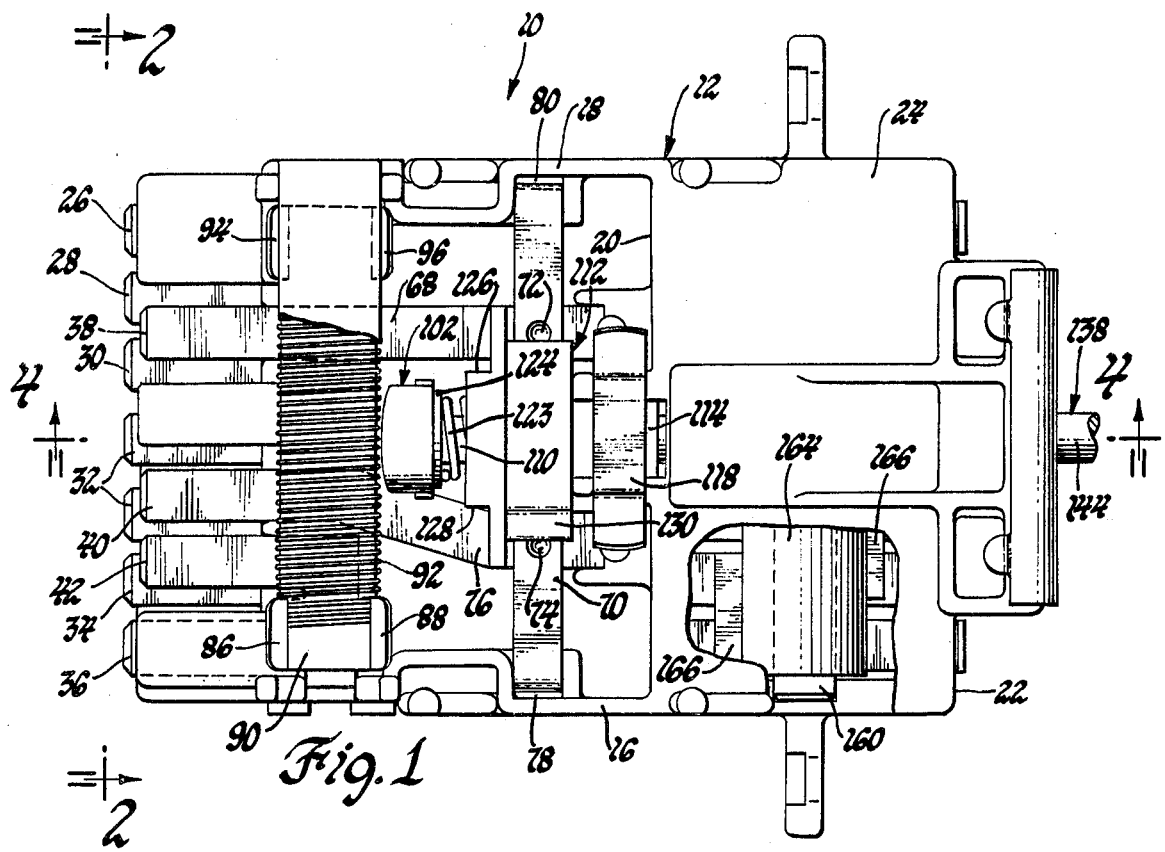
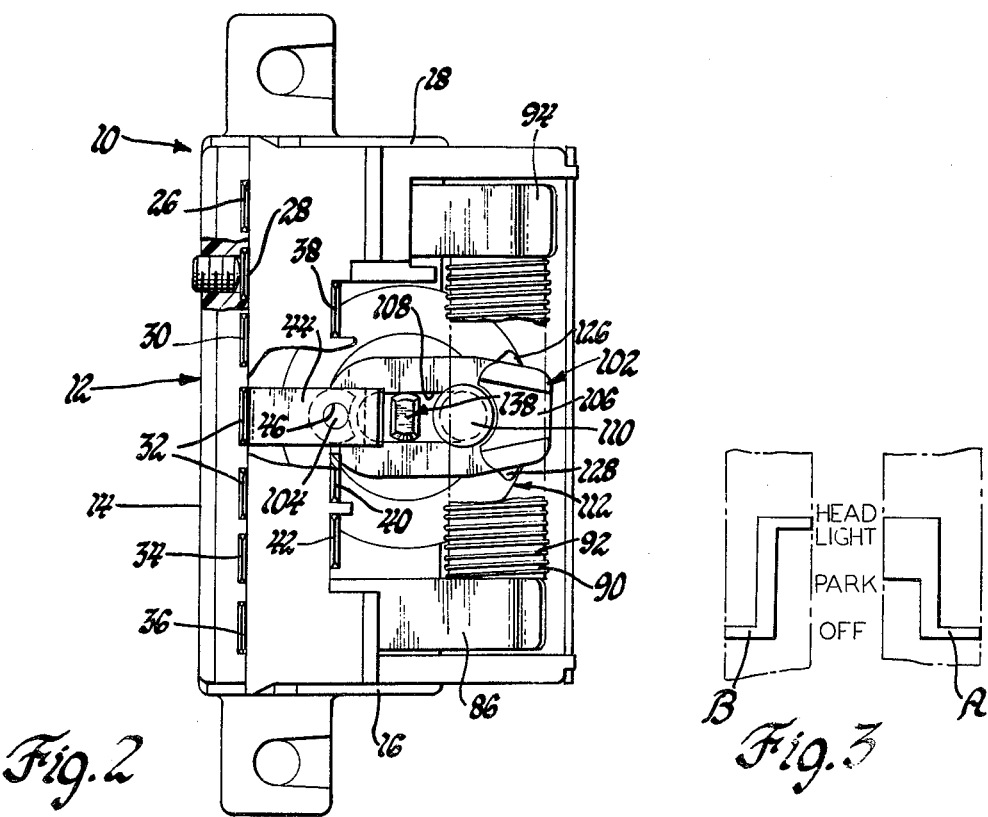

PUSH-PULL ROTARY SYSTEM

FIELD OF THE INVENTION

The invention relates to switches and more particularly concerns a push-pull rotary switch capable of controlling a plurality of lighting circuits such as the headlights, tail lights, parking lights and the dome light on a motor vehicle.

SUMMARY OF THE INVENTION

More specifically, the rotary switch according to the invention includes a rotatable actuator rod that is longitudinally movable for closing a first switch means which controls a first lighting circuit. When the rod is rotated to a predetermined position, a second switch means is operated for controlling a second lighting circuit irrespective of the longitudinal position of the rod. The first switch means is characterized by having a rotatable support wheel made of insulating material and connected to the rod between the ends thereof by a ball and socket connection. A detent engages the support wheel for providing at least two distinct positions thereof. A coded metallic contactor member is fixed with the support wheel and is supported for rotation about an axis that is substantially perpendicular to the longitudinal axis of the rod. The rotational movement of the contactor member occurs upon longitudinal movement of the rod and permits selective connecting of a first pair of contacts to thereby provide a first lighting circuit. The second switch means includes a rotor and a contactor bar member. The rotor is connected to one end of the rod and is adapted to be rotated thereby so as to cause a radially extending tab formed on the rotor to depress a central portion of the contactor bar member when the rod is rotated to the aforementioned predetermined position. The latter movement causes a closing of the second lighting circuit by connecting a second pair of contacts.

The objects of the present invention are to provide a new and improved switch having a contactor wheel which is adapted to be rotated in response to longitudinal movement of an actuator rod for selectively opening and closing a plurality of lighting circuits; to provide a new and improved push-pull rotary switch having a contactor wheel that is rotated in response to the longitudinal movement of an elongated actuator rod for closing at least one switch means and in which one end of the rod is connected to a rotor that is controlled by the rotation of the rod irrespective of the longitudinal position of the rod for operating an additional switch means; to provide a new and improved compact switch having push-pull and rotary operation that includes a housing which supports a plurality of flat contact blades located in spaced parallel planes and which are selectively connected for establishing a plurality of lighting circuits by movement of a pair of members which are independently supported for rotation about mutually perpendicular axes; to provide a new and improved switch that includes an actuator rod connected through a ball and socket connection to a rotatable contactor wheel that is coded along its periphery so as to open and close a plurality of lighting circuits upon longitudinal movement of the actuator rod between three distinct positions; and to provide a new and improved switch assembly having a rheostat for varying the light intensity of a lamp in a lighting circuit and in which the resistance wire of the rheostat is wound about a right cylindrical core that is removably supported by a pair of upstanding spring clips.

BRIEF DESCRIPTION OF THE DRAWING

Other objects and advantages of the present invention will be more apparent from the following detailed description when taken with the drawings in which:

FIG. 1 is a plan view of a push-pull rotary electric switch made according to the invention, FIG. 2 is a rear elevational view of the switch shown in FIG. 1 taken on line 2—2, FIG. 3 is a developed view of the contactor members carried by the support wheel incorporated with the switch.

DESCRIPTION OF THE PREFERRED EMBODIMENT

Figure 4:
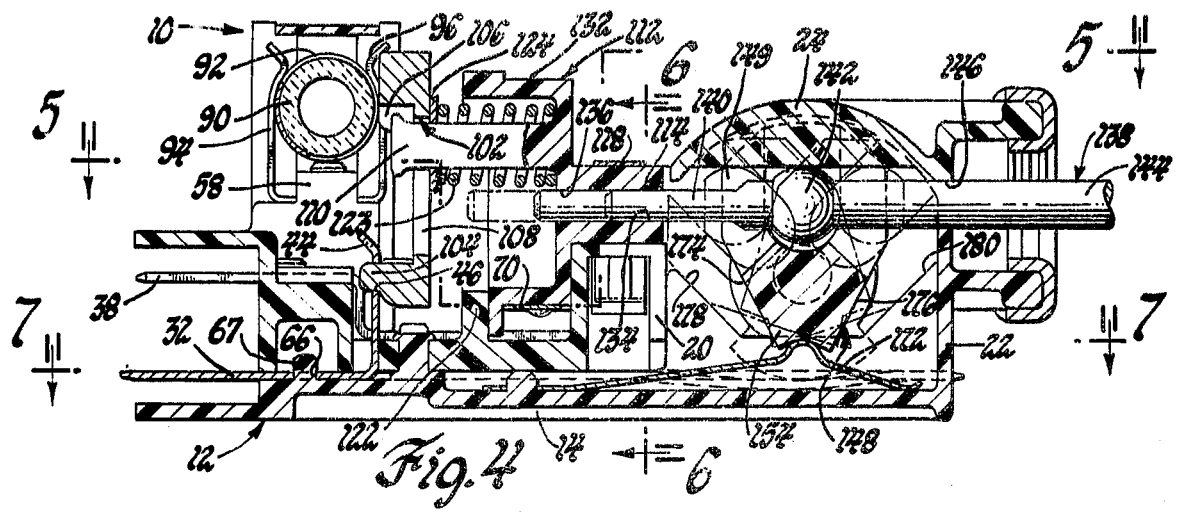
FIG. 4 is a sectional view taken on line 4—4 of FIG. 1.
Figure 5:
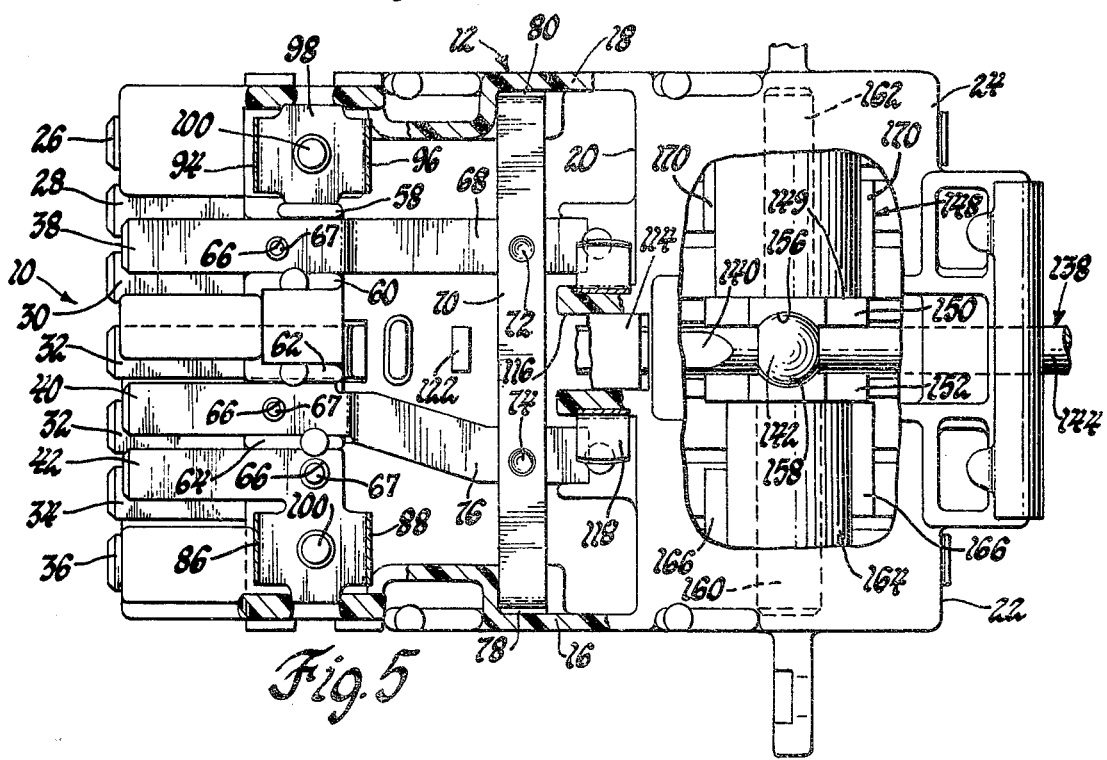
FIG. 5 is a view partly in section taken on line 5—5 of FIG. 4.
Figure 6:
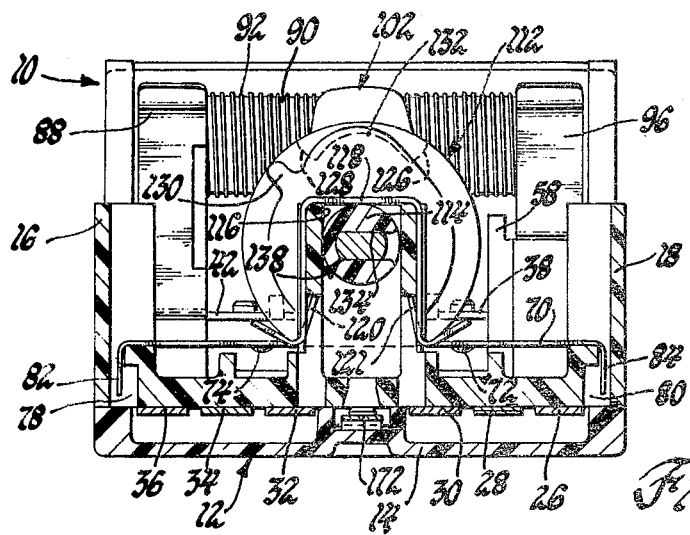
FIG. 6 is a sectional view taken on line 6—6 of FIG. 4.

Referring to the drawings and more particularly to FIGS. 1-5 thereof, a push-pull rotary electric switch 10 is shown comprising a two-piece housing 12 which is made of an insulating material such as plastic and generally consists of a base portion 14, side walls 16 and 18, end walls 20 and 22, and a top portion 24. The base portion 14 supports a plurality of contact members made from an electric conducting material such as copper and identified by the reference numerals 26-42. The contact members 26, 28, 30, 34 and 36 lie in the same plane, as seen in FIGS. 5 and 6, and each takes the form of an elongated narrow flat blade. Contact member 32 is also formed as a flat blade and has a major portion thereof located in the same plane with the latter mentioned contact members. In addition, however, and as seen in FIG. 7, contact member 32 is "h" shaped and is integrally formed with an upstanding tab member 44 which has a circular bore 46 formed therein.

Figure 7:
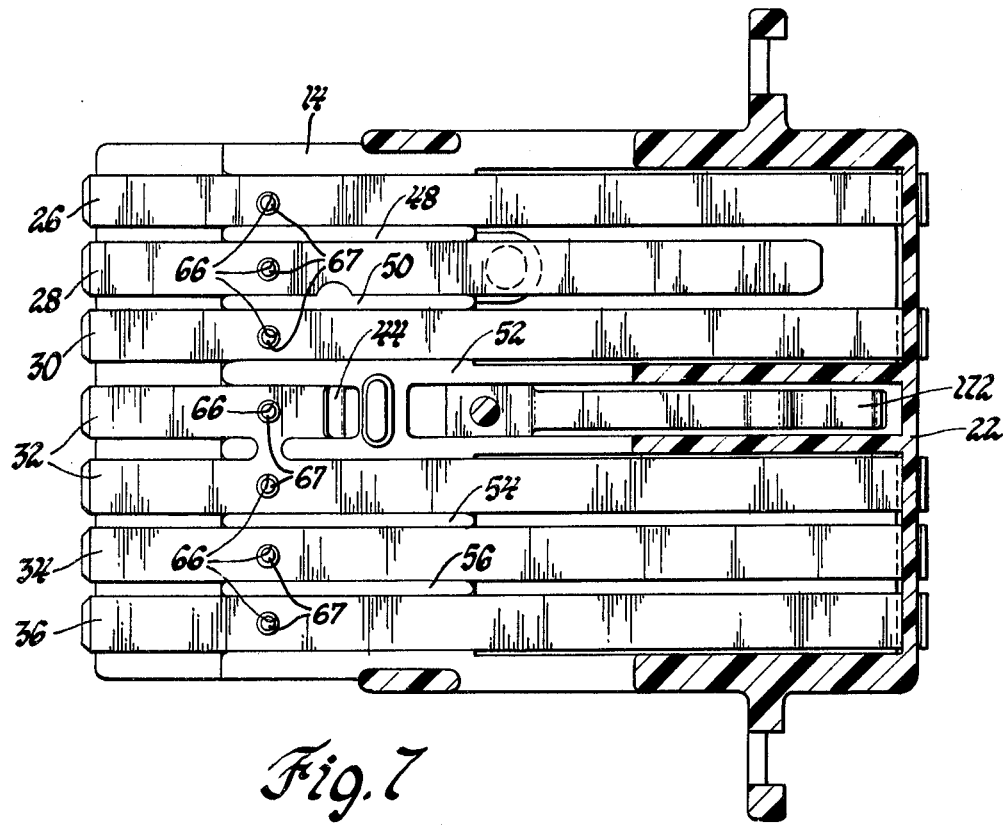
FIG. 7 is a view taken on line 7—7 of FIG. 4.

The contact members 26-38 are appropriately supported by the base portion 14 of the housing and maintain their spaced relative positions as seen in FIG. 7 through a plurality of upstanding spacer members 48-56 which are equally spaced along a transverse axis of the housing and integrally formed therewith. The contact member 28 is a circuit breaker that serves as an overload protection for the switch and is made of a bi-metal having generally the same outer configuration as the contact members 26 and 30. Each of the contact members 26-42 have a terminal portion at one end thereof that extends out of the housing (left hand end of the switch as seen in FIG. 10) and are adapted to be connected to a suitable wiring harness leading to lighting circuits to be described hereinafter.

As seen in FIG. 4, the contact members 38 and 40 are generally Z-shaped when viewed in elevation and are provided with terminal portions which extend to the left externally of the housing and are maintained in spaced relative positions as seen in FIG. 5 by upstanding spacer members 58-64 integrally formed with the housing. In addition, it will be noted that each of the contact members 38 and 40, as well as the other contact members incorporated with this switch, has a circular aperture 66 formed therein which accommodates an upstanding pin 67 integrally molded with the housing for preventing any longitudinal movement of the associated contact member. As seen in FIGS. 4 and 5, contact member 38 has inwardly extending contact portion 68 that is in line with the outer terminal portion thereof and is located beneath one end of a contact bar member 70 that extends transversely of the longitudinal axis of the housing and is formed with a pair of spaced dimples 72 and 74. The inner portion 68 of the contact member 38 is located directly below dimple 72 while a bent inner contact portion 76 of the contact member 40 is located beneath the dimple 74. The contact bar member 70 has the opposite ends thereof suitably positioned within identical openings 78 and 80 formed adjacent side walls 16 and 18 respectively of the housing. As seen in FIG. 6, the opposite ends of the contact bar member 70 terminates with integral downwardly extending portions 82 and 84 which are respectively located within the openings 78 and 80.

As seen in FIG. 5, the contact member 42 is integrally formed with a pair of upstanding spring clip members 86 and 88 which are normally biased towards each other and serve as supports for one end of a right cylindrical core member 90 that is made from a ceramic material and is tubular in configuration. The core member 90 supports a resistance wire 92 that is wound about the outer periphery of the core member from one end to the other. The other end of the core member 90 is similarly mounted within a pair of upstanding spring clip members 94 and 96 which are integrally formed with a base section 98 that is suitably apertured in the manner of contact member 42 for accommodating an upstanding pin 100 integral with the housing.

The resistance wire wound core member 90 forms a part of a rheostat assembly that includes a rotatable contactor member 102. The contactor member 102 takes the form of an elongated "0", as seen in FIG. 2, and has the lower end thereof integrally formed with a shaft portion 104 that is normally maintained within the aperture 46 formed in tab member 44 of the contact member 32. The contactor member 102 is made of a electrical conducting material such as copper and has a contact portion 106 which is normally biased into engagement with the resistance wire 92 wound about the core member 90. In this connection, it will be noted that the contactor member 102 has an oblong opening 108 formed therein which receives the outer end of a cylindrical driver member 110 which is integrally formed with a rotor 112 made of insulating material.

The rotor 112 is centrally positioned in the housing and has an integral shaft portion 114 supported for rotation within a U-shaped opening 116 formed in the housing. The shaft portion 114 is retained within the latter mentioned opening 116 by a U-shaped spring clip 118 having integral inwardly extending fingers 120 and 121 which cooperate with the lower ends of the side walls defining opening 116 for preventing the shaft portion 114 from moving vertically out of the latter mentioned opening. An upstanding stop member 122 integrally formed with the housing serves to prevent any axial movement of the rotor 112. As seen in FIG. 4, a coil spring 123 is wound about the driver member 110 and cooperates with a washer 124 for applying a force to the contactor 102 so as to cause the contact portion 106 to maintain contact with the resistance wire 92 of the core member 90.

As seen in FIGS. 1 and 2, the rotor 112, at one end thereof, is integrally formed with a pair of stop surfaces 126 and 128 which are adapted to cooperate with the stop member 122 for limiting rotation of the rotor 112 in opposite directions. In addition, and as seen in FIG. 6, the rotor 112 is also formed with a radially extending tab member 130 that is integral with a lobe portion 132 located at the other end of the rotor. As best seen in FIG. 6, when the rotor 112 is rotated counterclockwise so as to cause the stop surface 128 to contact the stop member 122, the tab member 130 depresses the central portion of the contact bar member 70 and moves the dimples 72 and 74 thereof into contact with portions 68 and 76 of the contact members 38 and 40. On the other hand, when the rotor 112 is rotated clockwise so as to cause the stop surface 126 thereof to contact the stop member 122, the tab member 130 does not engage the contact bar member 70; consequently, the latter maintains the position as shown in full lines in FIG. 6. It will be noted that rotation of the rotor 112 between the aforementioned positions also causes rotation of the contactor 102. As a result, the resistance in the lighting circuit made by contact members 32 and 42 is varied as the contact portion 106 is moved from a position where it contacts the spring clip 88 to a position where it contacts the spring clip member 96. In the former position, the light bulb in the lighting circuit will be fully illuminated while in the latter position the light bulb will be extinguished.

The shaft portion 114 of the rotor 112 is formed with a slot 134 which in cross section is rectangular and is longitudinally aligned with a similarly shaped bore 136 that is formed in the body of the rotor. A longitudinally extending actuator rod 138 has an inner end 140 which is rectangularly shaped in cross section and is supported for axial movement within the slot 134 and the bore 136 formed within the shaft portion 114.

The rod 138 includes an integrally formed spherical ball portion 142 that is rigidly connected with a cylindrically shaped outer end 144 which is adapted to be fixed to the usual knob (not shown) for controlling actuation of the rod. The outer end 144 of the rod 138 is supported in a bore 146 formed in the end wall 22 of the housing so as to allow longitudinal movement as well as rotational movement of the rod. As should be apparent when the rod 138 is rotated about its longitudinal axis, corresponding rotation of the rotor 122 occurs without causing any movement of a contactor wheel 148. On the other hand when the rod 138 is moved along its longitudinal axis, the contactor wheel 148 is moved between the full line and phantom line position shown in FIG. 4 without causing any movement of the rotor 112.

The contactor wheel 148 includes a socket portion 149 that is defined by a pair of upstanding walls 150 and 152 integral with a lower base portion 154. The walls 150 and 152 have curved surfaces 156 and 158 respectively formed therein for accommodating ball portion 142 of the rod. The socket portion 149 can be made of the same type of insulating material used for making the housing and includes a pair of integral oppositely extending shaft members 160 and 162 which are supported for rotation about a transverse axis by the side walls 16 and 18 of the housing. The shaft member 160 non-rotatably supports a metallic cylindrical contactor 164 which has the periphery thereof integrally formed with a radially extending coded segment 166 which is adapted to selectively make engagement with the contact members 32, 34 and 36 depending upon the angular position of the contactor. Similarly, the shaft member 162 non-rotatably supports a metallic cylindrical contactor 168 which has the periphery thereof integrally formed with a radially extending coded segment 170 which cooperates with the contact members 26, 28 and 30 for providing selected connection therebetween depending upon the angular position of the contactor wheel 148. In this connection, attention is directed to FIG. 3 which illustrates foot prints A and B which would be made by the segments 166 and 170 respectively when the contactor wheel 148 is rolled one full revolution on a flat surface.

Figure 8:
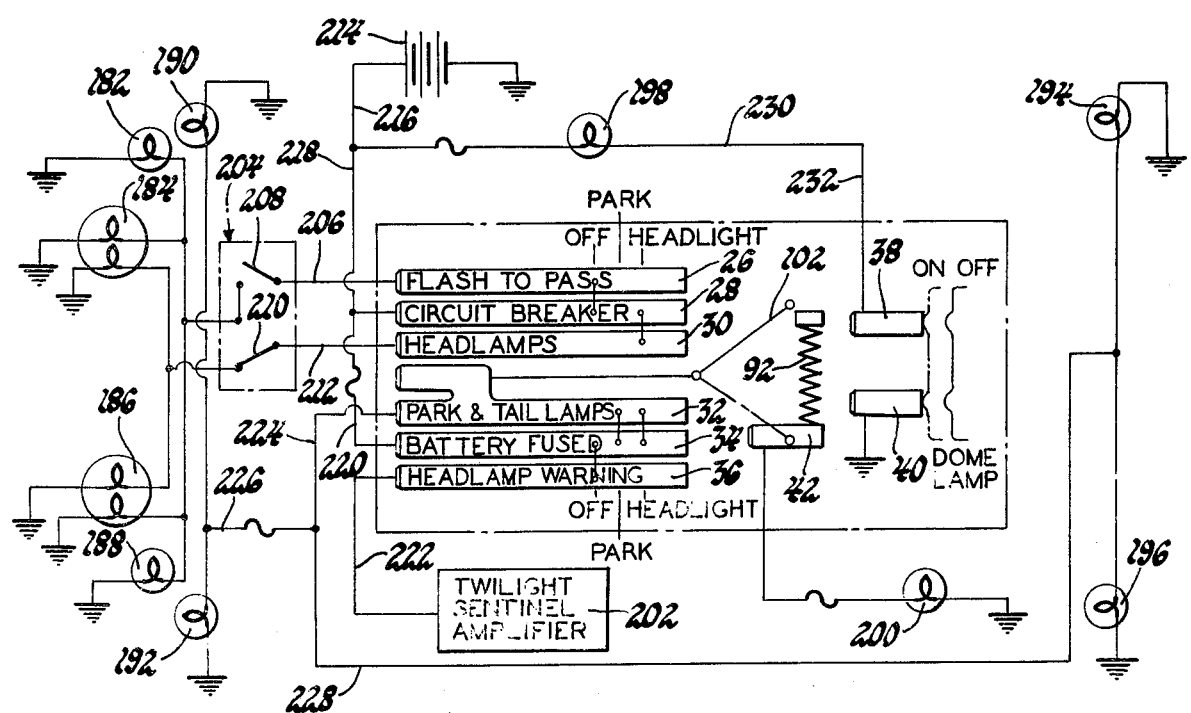
FIG. 8 is a schematic diagram of the several lighting circuits of a motor vehicle controlled by the switch made according to this invention.

As mentioned, the contactor wheel 148 is movable between the three positions shown in FIG. 4 by longitudinal movement of the rod. It will be noted that the lower base portion 154 of the socket portion 149 is V-shaped and cooperates with a detent spring 172 for providing the three longitudinal positions of the rod. The socket portion 149 also has a pair of diverging end walls 174 and 176 which serve as stop surfaces for cooperation with a pair of inclined surfaces 178 and 180 integrally formed with the housing. Accordingly, when the rod 138 is moved from the full line position towards the left as seen in FIG. 4, the contactor wheel 148 rotates about the supporting shaft members 160 and 162 in a counterclockwise direction with the surfaces 174 and 178 making contact and preventing any further rotation. This is the "off" position of the switch with the segment 170 connecting contact members 26 and 28 while segment 166 connects contact members 34 and 36 as seen in FIG. 8. In this position, neither the headlamps nor the parking lamps are lighted. In addition, the dome lamp will not be energized assuming the rotor 112 has not been rotated so as to cause tab member 130 to depress contact bar member 70. Now by moving the rod 138 towards the right to the full line position of FIG. 4, the "park" position is attained causing segment 170 to engage contact member 28 only while segment 166 connects contact members 32 and 34 as seen in FIG. 8. At this time, the parking lamps and tail lamps will be energized. Finally, when the rod 138 is moved towards the right from the full line "park" position to the phantom line position, the segment 170 connects the contact members 28 and 30 while the segment 166 connects contact members 32 and 34 as seen in FIG. 8. This is the "headlight" position of the contactor wheel 148 at which time the headlights, parking lamps and the tail lamps are energized with the wall 176 of the socket portion 149 engaging the surface 180. It will be understood that in each of the above-mentioned positions of the rod 138, the detent spring 172 provides a holding force to maintain the contactor wheel 148 in the selected position.

Referring now to FIG. 8, a schematic circuit diagram is shown incorporating the switch of this invention electrically connected to various elements of the motor vehicle lighting system. It will be noted that the parts shown in FIG. 7 that correspond to the parts described above are identified by identical reference numerals.

The headlamps of the motor vehicle are designated by the reference numerals 182, 184, 186, 188 while the parking lamps are identified by reference numerals 190 and 192. The tail lamps identified by reference numerals 194 and 196 and the dome lamp within the interior of the vehicle is identified by reference numeral 198. In addition, reference numeral 200 identifies the instrument panel lamp while reference numeral 202 identifies a twilight sentinel amplifier. Also, it will be noted that the dimmer switch is designated by the reference numeral 204.

Contact member 26 provides a "Flash to Pass" function and is connected by a conductor 206 to one side of a normally open switch 208 the other side of which is connected to the high beam filaments of headlamps 182 and 188 and the high-beam filaments of headlamps 184 and 186. A normally closed switch 210 has one side thereof connected by a conductor 212 to the contact member 30 identified as "Headlamp" while the other side is connected to the low-beam filaments of headlamps 184 and 186. In the "off" position of the switch 10, segment 170 of the contactor wheel 148 electrically connects contact members 26 and 28 as aforedescribed and thereby connects the battery 214 via conductors 216 and 218 to the dimmer switch 204. Thus, when the switch 208 is closed, the high-beam filaments of the headlamps 182-188 can be energized during day time driving and thereby give a "Flash to Pass" signal. In addition, in the "off" position of the switch 10, the segment 166 connects the contact member 34 (identified as "Battery Fused") with contact member 36 (identified as "Headlamp Warning"). Thus, battery 214 is electrically connected to the "Twilight Sentinel Amplifier" 202 at this time by conductors 216, 218, 220 and 222.

When the actuator rod 138 is shifted longitudinally to the right so as to cause the contactor wheel 148 to assume the full line position of FIG. 4, the switch 10 is in the "park" position as aforementioned. At this time, contact members 26 and 28 are disconnected and segment 170 is in contact solely with contact member 28. At the same time, segment 166 electrically connects contact members 32 and 34 resulting in energization of the park lamps 190 and 182 and tail lamps 194 and 196. This circuit is established from battery 214 via conductors 216, 218, 220, contact member 34, contact member 32, conductor 224, 226 and 228. At the same time, the instrument panel light 200 can be energized depending upon the position of the rotor 112, as previously explained. Thus, when the contactor 102 is in the position shown in FIG. 8, the contactor 102 engages the spring clip 94 and the instrument panel light 200 is not energized. On the other hand, when the rotor 112 is rotated counterclockwise as seen in FIG. 6, so that the tab member 130 contacts the stop member 122, the contactor 102 assumes the phantom line position seen in FIG. 8 so as to provide maximum light intensity of the instrument panel lamp 200.

When it is desired to energize the low-beam filaments of headlamps 184 and 186, the rod 138 is pulled outwardly relative to the housing so as to cause the contactor wheel 148 to assume the "headlight" position with the wall 176 engaging surface 180 as aforedescribed. At this time, the segment 170 of the contactor wheel 148 electrically connects contact members 28 and 30 while segment 166 electrically connects contact members 32 and 34. Both the parking lamps 190 and 192 and tail lamps 194 and 196 as well as the instrument panel lamp 200 are maintained in electrical contact with battery 214 and the low-beam filaments of headlamps 184 and 186 are energized through the contact members 28 and 30, the conductor 212 and switch 210. The dome lamp 198 can be connected with battery 214 by rotating the rod 138 about its longitudinal axis so as to cause the tab member 130 to depress the contact bar member 70 as described so as to electrically connect the contact members 38 and 40 and through conductors 216, 230 and 232 establish a lighting circuit.

Various changes and modifications can be made in this construction without departing from the spirit of the invention. Such changes and modifications are contemplated by the inventors and they do not wish to be limited except by the scope of the appended claims.

The embodiments of the invention in which an exclusive property or privilege is claimed are defined as follows:

1. A push-pull rotary switch for controlling a plurality of lighting circuits on a motor vehicle that includes a rotatable actuator rod longitudinally movable for moving a first switch means for controlling a first lighting circuit and a second switch means operated when said rod is rotated to a predetermined position irrespective of the longitudinal position of the rod for controlling a second lighting circuit, the improvement wherein said first and second switch means are mounted in a housing and said first switch means comprises a socket member made of insulating material and connected to said rod between the ends thereof by a ball and socket connection, a detent engaging said socket member for providing at least two distinct positions of said socket member, a cylindrical contactor fixed with said socket member, said socket member having portions integrally formed therewith connected to said housing for supporting the socket member for rotation about an axis substantially perpendicular to the longitudinal axis of the rod upon longitudinal movement of the latter for causing said cylindrical contactor to selectively connect a first pair of terminals and thereby provide said first lighting circuit, said second switch means including a rotor member and a contact bar member, said rotor member being connected to one end of said rod and being rotatable thereby, said rotor member having a radially extending tab formed therewith for depressing said contact bar member when said rod is at said predetermined position so as to close said second lighting circuit by connecting a second pair of terminals.

2. A push-pull rotary switch for controlling a plurality of lighting circuits on a motor vehicle that includes a rotatable actuator rod longitudinally movable for moving a first switch means for controlling a first lighting circuit and a second switch means operated when said rod is rotated to a predetermined position irrespective of the longitudinal position of the rod for controlling a second lighting circuit, the improvement wherein said first and second switch means are mounted in a housing and said first switch means comprises a socket member made of insulating material and connected to said rod between the ends thereof by a ball and socket connection, said socket member having a base portion provided with a notch, a detent cooperating with said notch in said socket member for providing at least two distinct positions of said support member, a cylindrical contactor fixed with said socket member, said socket member having laterally extending shaft members integrally formed therewith connected to said housing for supporting the socket member for rotation about an axis substantially perpendicular to the longitudinal axis of the rod upon longitudinal movement of the latter for causing said cylindrical contactor to selectively connect a first pair of terminals and thereby provide said first lighting circuit, said second switch means including a rotor member and a contactor bar member, said rotor member being connected to one end of said rod and being rotatable thereby, said rotor member having a radially extending tab formed therewith for depressing the central portion of said contactor bar member when said rod is at said predetermined position so as to close said second lighting circuit by connecting a second pair of terminals.

3. A push-pull rotary switch for controlling a plurality of lighting circuits on a motor vehicle that includes a rotatable actuator rod longitudinally movable for moving a first switch means for controlling a first lighting circuit and a second switch means operated when said rod is rotated to a predetermined position irrespective of the longitudinal position of the rod for controlling a second lighting circuit, the improvement wherein said first and second switch means are mounted in a housing and said first switch means comprises a socket member made of insulating material, a spherical bearing surface formed in said socket member, a ball member formed on said rod between the ends thereof and located in said spherical bearing surface so as to provide a ball and socket connection between said socket member and said rod, said socket member having a base portion provided with a notch at the lower end thereof, a spring member cooperating with said notch in said socket member for providing at least two distinct positions of said socket member, a cylindrical contactor fixed with said socket member, a pair of shaft members integrally formed with said socket member and connected to said housing for supporting the socket member for rotation about an axis substantially perpendicular to the longitudinal axis of the rod whereby longitudinal movement of the latter causes the cylindrical contactor to selectively connect a first pair of terminals and thereby provide said first lighting circuit, said second switch means including a cylindrical rotor member and a contactor bar member, said contactor bar member being located along an axis parallel to the rotational center axis of said pair of shaft members, said rotor member being connected to one end of said rod and being rotatable thereby, said rotor member having a radially extending tab formed therewith for depressing the central portion of said contactor bar member when said rod is at said predetermined position so as to close said second lighting circuit by connecting a second pair of terminals.

4. A push-pull rotary switch for controlling a plurality of lighting circuits on a motor vehicle comprising a rectangular housing having an enclosed chamber formed therein, a plurality of elongated and parallel blade-like conductor members mounted in said housing in side by side relationship, a contact wheel supported by said housing for rotation about an axis extending transversely to the longitudinal axis of said housing for selectively connecting adjacent pairs of said conductor members when said contact wheel is rotated to three predetermined positions, said contact wheel including a socket member made of an insulating material, a spherically shaped pocket formed in said socket member, an elongated actuator rod having an integral ball member formed therewith between the outer ends of said rod, said ball member being located in said pocket, said housing having axially aligned bores formed therein along an axis parallel to said longitudinal axis for supporting the ends of said actuator rod for longitudinal and rotational movement whereby said longitudinal movement causes said contact wheel to be moved to one of said three predetermined positions while rotational movement of the actuator rod causes said ball member to rotate in said pocket without moving the contact wheel, a rheostat assembly located at one end of said actuator rod for varying the light intensity of one of the lighting circuits made by said contact wheel when rotated to one of said predetermined positions, said rheostat assembly including a rotor member that slidably and non-rotatably accommodates said one end of said actuator rod, a driver member projecting outwardly from said rotor member, a contactor having a lower portion thereof pivotally supported by one of said conductor members and having an oblong slot formed therein, a cylindrical ceramic core member having a resistance wire wound thereabout which is connected to another of said conductor members, and spring means urging the upper portion of said contactor into continuous engagement with said resistance wire, said driver member being located in said oblong slot formed in said contactor whereby rotation of said actuator after said contact wheel is located in said one of said predetermined positions results in the upper portion of said contactor moving along said resistance wire to vary the light intensity of said one of the lighting circuits.

5. A push-pull rotary switch for controlling a plurality of lighting circuits on a motor vehicle comprising a rectangular housing having a pair of laterally spaced side walls and a pair of end walls, a top portion and a bottom portion connected to said side walls and said end walls so as to form an enclosed chamber, a plurality of elongated and parallel blade-like conductor members mounted on said bottom portion in side by side parallel relationship, a contact wheel supported by said side walls within said chamber for rotation about an axis extending transversely to the longitudinal axis of the housing for selectively connecting adjacent pairs of said conductor members when said contact wheel is rotated to three predetermined positions, said contact wheel including a socket member made of an insulating material, a spherically shaped pocket formed in said socket member, an elongated actuator rod having an integral ball member formed therewith between the outer ends of said rod, said ball member being located in said pocket, said end walls having axially aligned bores formed therein for supporting the outer ends of said actuator rod for longitudinal and rotational movement whereby said longitudinal movement causes said contact wheel to be moved to one of said three predetermined positions while rotational movement of the actuator rod causes said ball member to rotate in said pocket without moving the contact wheel, a rheostat assembly located at one end of said actuator rod for varying the intensity of one of the lighting circuits made by said contact wheel when rotated to one of said predetermined positions, said rheostat assembly including a rotor member having a bore formed therein for slidably and non-rotatably accommodating said one end of said actuator rod, a driver member projecting outwardly from said rotor member along an axis parallel to the longitudinal axis of said actuator rod, a contactor having a lower portion thereof pivotally supported by one of said conductor members and having an oblong slot formed therein, a cylindrical ceramic core member having a resistance wire wound thereabout which is connected to another of said conductor members, and a spring carried by the driver member for urging the upper portion of said contactor into continuous engagement with said resistance wire, said driver member being located in said oblong slot formed in said contactor whereby rotation of said actuator after said contact wheel is located in said one of said predetermined positions results in the upper portion of said contactor moving along the core member to vary the light intensity of said one of the lighting circuits.

6. A push-pull rotary switch for controlling a plurality of lighting circuits on a motor vehicle comprising a housing having a pair of laterally spaced side walls and a pair of end walls, a top portion and a bottom portion connected to said side walls and said end walls so as to form an enclosed chamber, a plurality of elongated blade-like conductor members mounted on said bottom portion along axes parallel to the longitudinal axis of said housing, a contact wheel supported by said side walls within said chamber for rotation about an axis extending transversely to said longitudinal axis for selectively connecting adjacent pairs of said conductor members when said contact wheel is rotated to three predetermined positions, said contact wheel including a socket member made of an insulating material, a spherically shaped pocket formed in said socket member, an elongated actuator rod having an integral ball member formed therewith between the opposite ends of said rod, said ball member located in said pocket, said end walls having axially aligned bores formed therein for supporting the ends of said actuator rod for longitudinal and rotational movement whereby said longitudinal movement causes said contact wheel to be moved to one of said three predetermined positions while rotational movement of the actuator rod causes said ball member to rotate in said pocket without moving the contact wheel, a rheostat assembly located at one end of said actuator rod for varying the intensity of one of the lighting circuits made by said contact wheel when rotated to one of said predetermined positions, said rheostat assembly including a rotor member having a bore formed therein for slidably and non-rotatably accommodating said one end of said actuator rod, a driver member projecting outwardly from said rotor member along an axis parallel to the longitudinal axis of said actuator rod, a contactor having a lower portion thereof pivotally supported by one of said conductor members and having an oblong slot formed therein, a cylindrical ceramic core member having a resistance wire wound thereabout which is connected to another of said conductor members, and a spring mounted on said driver member for urging the upper portion of said contactor into continuous engagement with said resistance wire, said driver member being located in said oblong slot formed in said contactor whereby rotation of said actuator after said contact wheel is located in said one of said predetermined positions results in the upper portion of said contactor moving along the core member to vary the light intensity of said one of the lighting circuits.

7. A push-pull rotary switch for controlling a plurality of lighting circuits on a motor vehicle comprising a housing having a pair of laterally spaced side walls and a pair of end walls, a top portion and a bottom portion connected to said side walls and said end walls so as to form an enclosed chamber, a plurality of elongated blade-like conductor members mounted on said bottom portion along axes parallel to the longitudinal axis said housing, a contact wheel supported by said side walls within said chamber for rotation about an axis extending transversely to said longitudinal axis for selectively connecting adjacent pairs of said conductor members when said contact wheel is rotated to three predetermined positions, detent means mounted on said bottom portion and cooperating with said contact wheel for providing said three predetermined positions of the latter, said contact wheel including a socket member made of an insulating material, a spherically shaped pocket formed in said socket member, an elongated actuator rod having an integral ball member formed therewith between the outer ends of said rod, said ball member located in said pocket, said end walls having axially aligned bores formed therein for supporting the ends of said actuator rod for longitudinal and rotational movement whereby said longitudinal movement causes said contact wheel to be moved to one of said three predetermined positions while rotational movement of the actuator rod causes said ball member to rotate in said pocket without moving the contact wheel, a rheostat assembly located at one end of said actuator rod for varying the intensity of one of the lighting circuits made by said contact wheel when rotated to one of said predetermined positions, said rheostat assembly including a rotor member having a bore formed therein for slidably and non-rotatably accommodating said one end of said actuator rod, a driver member projecting outwardly from said rotor member along an axis parallel to the longitudinal axis of said actuator rod, a contactor having a lower portion thereof pivotally supported by one of said conductor members and having an oblong slot formed therein, a cylindrical ceramic core member having a resistance wire wound thereabout, a spring clip portion supporting one end of said core member and being integrally formed with another of said conductor members, and spring means on said driver member for urging the upper portion of said contactor into continuous engagement with said resistance wire, said driver member being located in said oblong slot formed in said contactor whereby rotation of said actuator after said contact wheel is located in said one of said predetermined positions results in the upper portion of said contactor moving along the core member to vary the light intensity of said one of the lighting circuits.

* * * * *